United States Patent
Honda et al.

(10) Patent No.: US 12,051,816 B2
(45) Date of Patent: Jul. 30, 2024

(54) LAMINATED BATTERY

(71) Applicant: Panasonic Intellectual Property Management Co., Ltd., Osaka (JP)

(72) Inventors: Kazuyoshi Honda, Osaka (JP); Akira Kawase, Osaka (JP); Eiichi Koga, Osaka (JP); Kouji Nishida, Osaka (JP); Noboru Masuda, Nara (JP); Takeshi Yamasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 536 days.

(21) Appl. No.: 17/460,311

(22) Filed: Aug. 30, 2021

(65) Prior Publication Data

US 2021/0391617 A1    Dec. 16, 2021

Related U.S. Application Data

(63) Continuation of application No. PCT/JP2019/044537, filed on Nov. 13, 2019.

(30) Foreign Application Priority Data

Mar. 12, 2019    (JP) ................................. 2019-045155

(51) Int. Cl.
*H01M 50/548*    (2021.01)
*H01M 10/0525*   (2010.01)
(Continued)

(52) U.S. Cl.
CPC ..... *H01M 50/186* (2021.01); *H01M 10/0525* (2013.01); *H01M 50/531* (2021.01);
(Continued)

(58) Field of Classification Search
CPC .......... H01M 50/186; H01M 10/0525; H01M 50/531; H01M 50/54; H01M 50/548;
(Continued)

(56) References Cited

U.S. PATENT DOCUMENTS

| | | | |
|---|---|---|---|
| 10,056,577 B2* | 8/2018 | Jang ..................... | H01M 50/119 |
| 2005/0141170 A1* | 6/2005 | Honda ................. | C23C 14/042 |
| | | | 429/162 |
| 2012/0216394 A1* | 8/2012 | Kitaura ............... | H01M 10/052 |
| | | | 29/623.2 |
| 2013/0280598 A1 | 10/2013 | Shigematsu et al. | |

(Continued)

FOREIGN PATENT DOCUMENTS

| | | |
|---|---|---|
| JP | 2013-097907 | 5/2013 |
| JP | 2014-116156 | 6/2014 |

(Continued)

OTHER PUBLICATIONS

International Search Report of PCT application No. PCT/JP2019/044537 dated Feb. 10, 2020.
(Continued)

*Primary Examiner* — Michael L Dignan
(74) *Attorney, Agent, or Firm* — Rimon P.C.

(57) ABSTRACT

A laminated battery includes battery cells which are laminated and a current collecting lead. Each of the battery cells has a structure in which a positive electrode current collector, a positive electrode active material layer, a solid electrolyte layer, a negative electrode active material layer, and a negative electrode current collector are laminated in this order. The battery cells include first and second battery cells adjacent to each other. At least the second battery cell has a side surface inclined with respect to a laminating direction of the battery cells. The first battery cell has a surface facing the second battery cell and including an exposed surface not in contact with the second battery cell. At least part of the exposed surface overlaps at least part of the side surface of the second battery cell viewed from the laminating direction.

(Continued)

The current collecting lead is connected to the exposed surface.

9 Claims, 12 Drawing Sheets

(51) Int. Cl.
  *H01M 50/186* (2021.01)
  *H01M 50/531* (2021.01)
  *H01M 50/54* (2021.01)
  *H01M 50/553* (2021.01)

(52) U.S. Cl.
  CPC ......... *H01M 50/54* (2021.01); *H01M 50/548* (2021.01); *H01M 50/553* (2021.01)

(58) Field of Classification Search
  CPC ........... H01M 50/553; H01M 10/0562; H01M 10/0585; Y02E 60/10; Y02P 70/50
  See application file for complete search history.

(56) References Cited

U.S. PATENT DOCUMENTS

| | | | |
|---|---|---|---|
| 2015/0064506 A1* | 3/2015 | Christensen | H01M 10/0562 429/7 |
| 2016/0260978 A1* | 9/2016 | Fujii | H01M 50/531 |
| 2018/0123115 A1* | 5/2018 | Kato | H01M 10/0585 |
| 2018/0301761 A1* | 10/2018 | Miyake | H01M 50/54 |
| 2018/0337422 A1* | 11/2018 | Iwamoto | H01M 4/0404 |

FOREIGN PATENT DOCUMENTS

| | | |
|---|---|---|
| JP | 2015-153663 | 8/2015 |
| JP | 2016-207493 A | 12/2016 |
| JP | 2018-195573 A | 12/2018 |
| JP | 2019-197652 | 11/2019 |
| WO | 2012/081366 A1 | 6/2012 |

OTHER PUBLICATIONS

The Indian Office Action dated Mar. 13, 2023 for the related Indian Patent Application No. 202147039990.

* cited by examiner

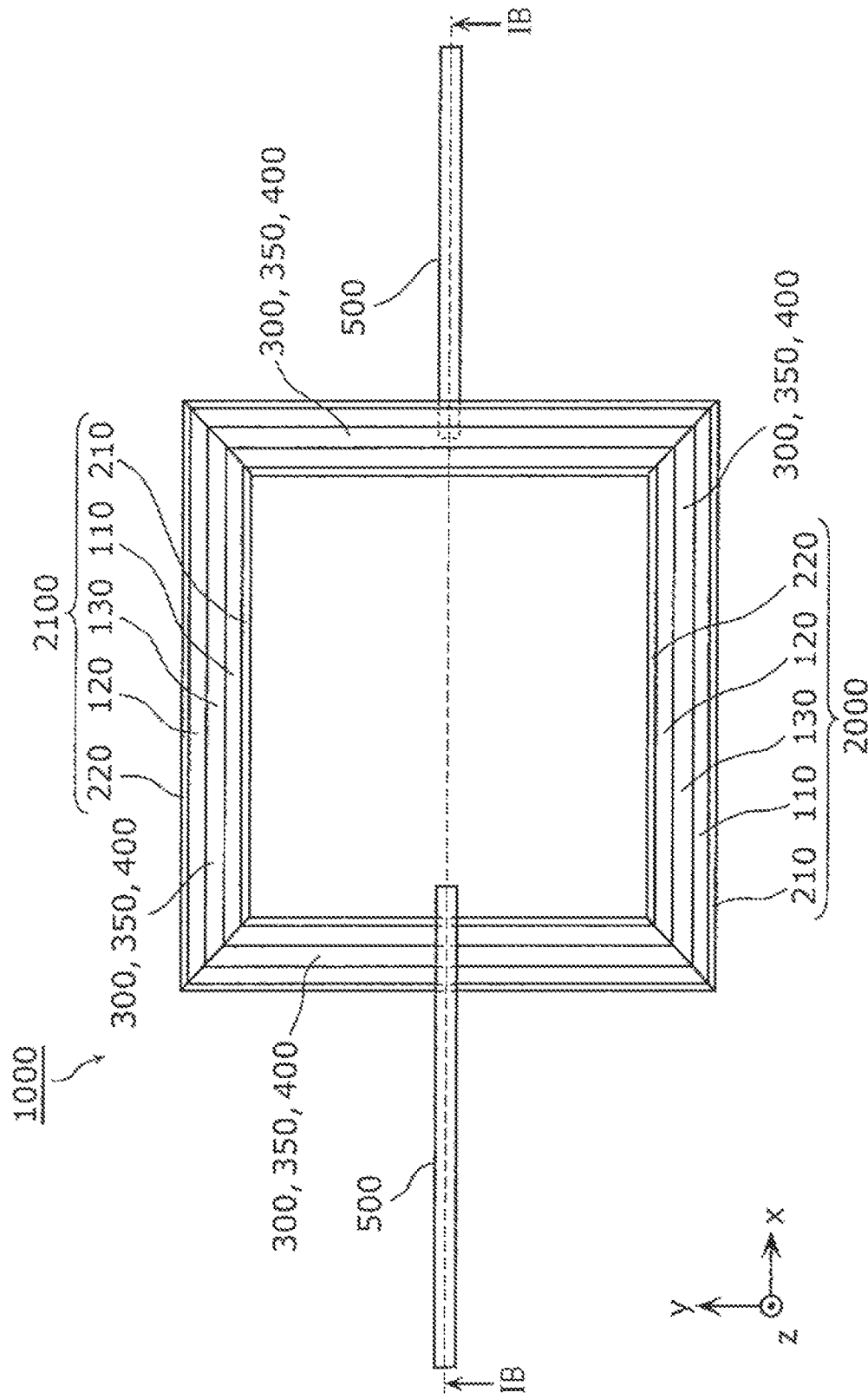

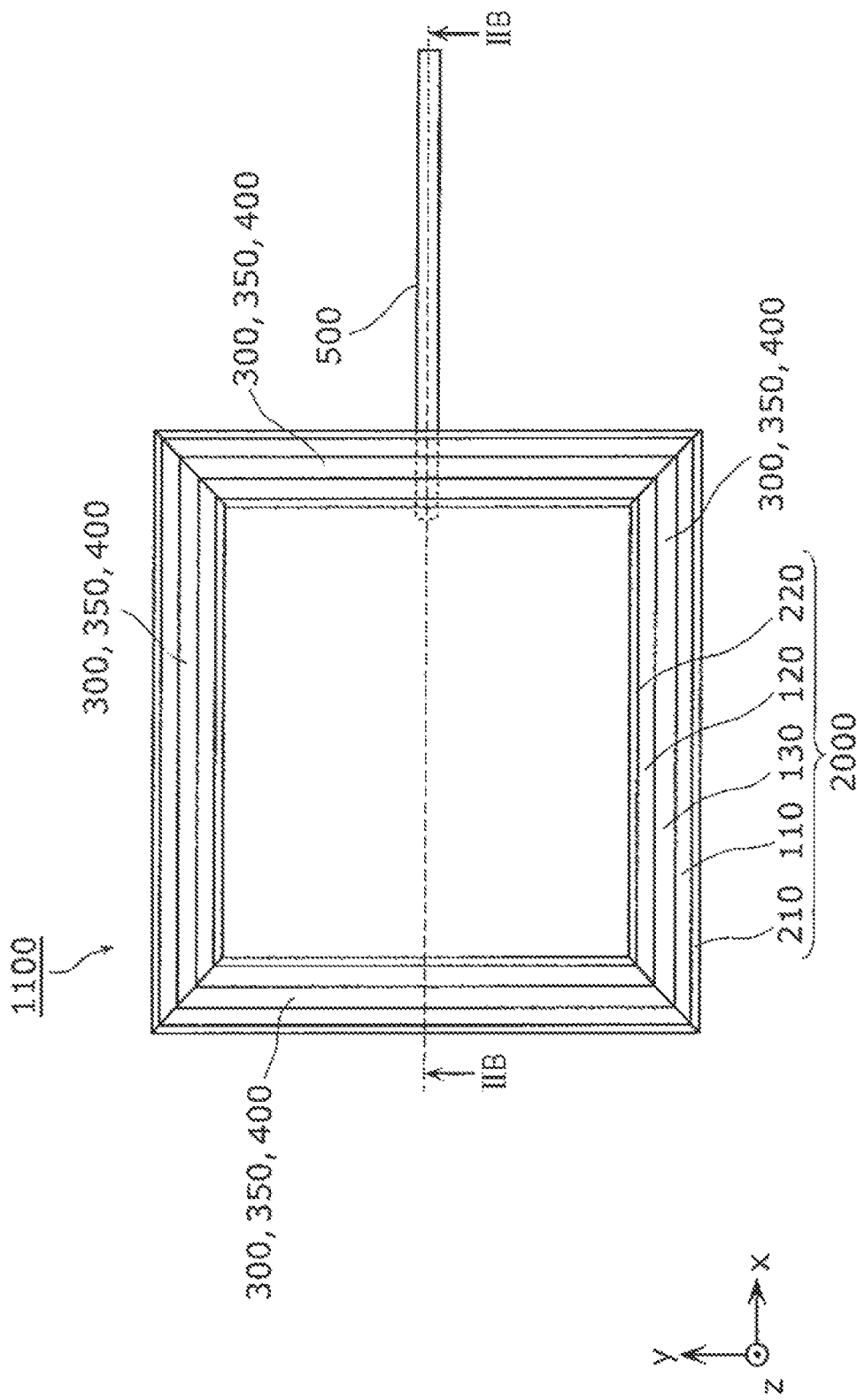

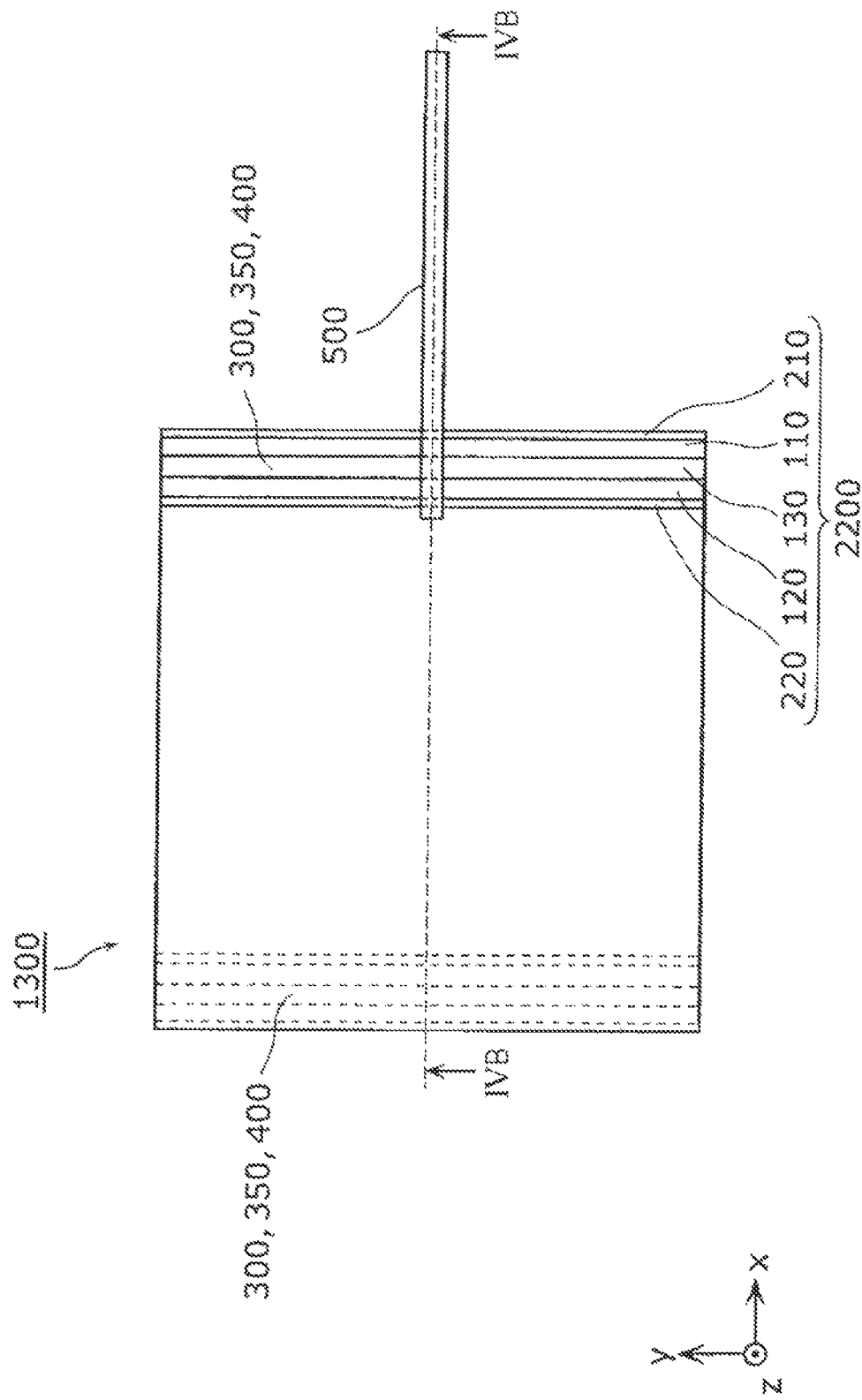

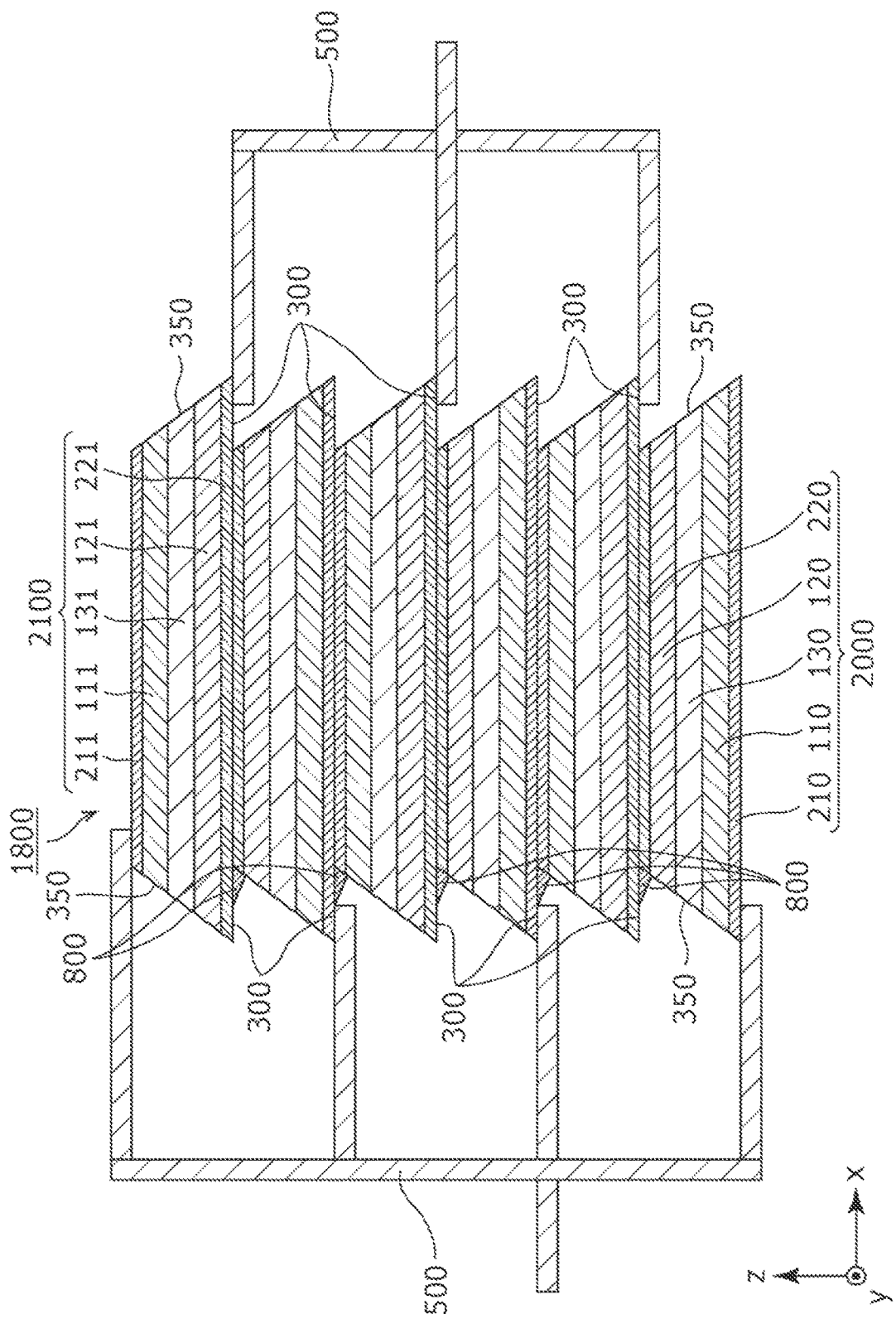

LAMINATED BATTERY

BACKGROUND

1. Technical Field

The present disclosure relates to a laminated battery.

2. Description of the Related Art

Japanese Unexamined Patent Application Publication No. 2013-97907 discloses a battery composed of a laminated battery including leads with different lengths.

Japanese Unexamined Patent Application Publication No. 2014-116156 discloses a bipolar laminated battery including unit cells and internal electrode layers that are laminated alternately with the unit cells.

Japanese Unexamined Patent Application Publication No. 2015-153663 discloses a bipolar secondary battery including positive electrode bodies and negative electrode bodies that differ in size from the positive electrode bodies. The positive and negative electrode bodies are laminated alternately with a solid electrolyte layer interposed between adjacent electrode bodies.

SUMMARY

It is desired to improve the reliability and battery capacity density of the conventional laminated batteries.

One non-limiting and exemplary embodiment provides a laminated battery with improved reliability and battery capacity density.

In one general aspect, the techniques disclosed here feature a laminated battery including a plurality of battery cells which are laminated and a current collecting lead. Each of the plurality of battery cells has a structure in which a positive electrode current collector, a positive electrode active material layer, a solid electrolyte layer, a negative electrode active material layer, and a negative electrode current collector are laminated in this order. The plurality of battery cells include a first battery cell and a second battery cell that are adjacent to each other. At least the second battery cell among the plurality of battery cells has a side surface inclined with respect to a laminating direction of the plurality of battery cells. The first battery cell has a surface facing the second battery cell. The surface facing the second battery cell includes an exposed surface that is not in contact with the second battery cell. At least part of the exposed surface overlaps at least part of the side surface of the second battery cell when viewed from the laminating direction. The current collecting lead is connected to the exposed surface.

Advantageous Effects of Invention

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a top view showing a schematic structure of a laminated battery in embodiment 1;

FIG. 2A is a top view showing a schematic structure of a cell stuck in modification 1 of embodiment 1;

FIG. 4A is a top view showing a schematic structure of a laminated battery in modification 3 of embodiment 1;

FIG. 9 is a cross-sectional view showing a schematic structure of a laminated battery in embodiment 3.

Figure 1B:
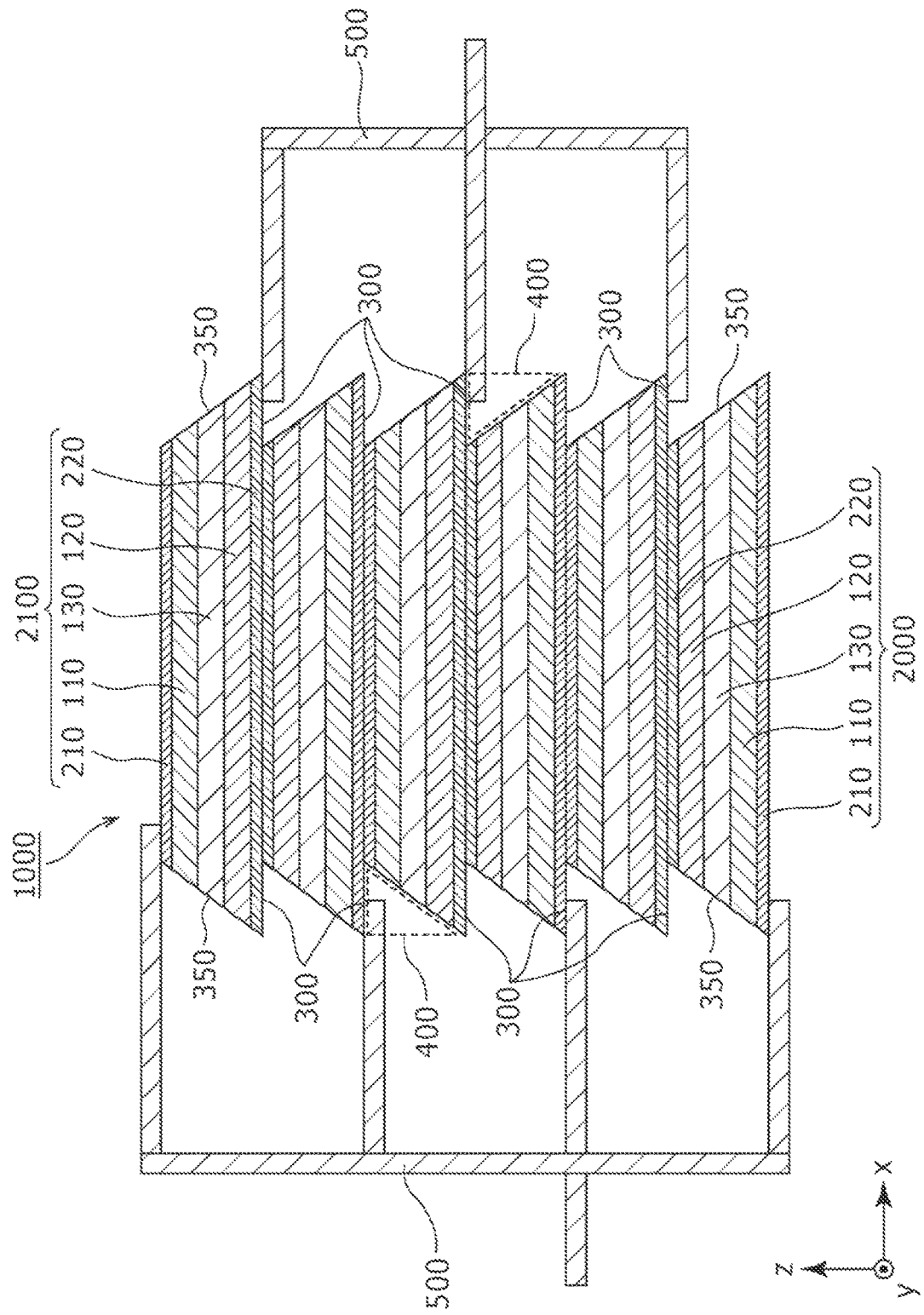
FIG. 1B is a cross-sectional view showing the schematic structure of the laminated battery in embodiment 1.

DETAILED DESCRIPTION (Overview of the Present Disclosure)

A laminated battery in one aspect of the present disclosure includes a plurality of battery cells which are laminated and a current collecting lead. Each of the plurality of battery cells has a structure in which a positive electrode current collector, a positive electrode active material layer, a solid electrolyte layer, a negative electrode active material layer, and a negative electrode current collector are laminated in this order. The plurality of battery cells include a first battery cell and a second battery cell that are adjacent to each other. At least the second battery cell among the plurality of battery cells has a side surface inclined with respect to a laminating direction of the plurality of battery cells. The first battery cell has a surface facing the second battery cell. The surface facing the second battery cell includes an exposed surface that is not in contact with the second battery cell. At least part of the exposed surface overlaps at least part of the side surface of the second battery cell when viewed from the laminating direction. The current collecting lead is connected to the exposed surface.

In the above structure, the current collecting lead is connected to the first battery cell through the use of the exposed surface not in contact with the second battery cell adjacent to the first battery cell. Since the first battery cell has the exposed surface, a space in which no battery cell is present is formed on the exposed surface, and therefore the effective volume of the laminated battery that functions as the battery is smaller than the apparent volume of the laminated battery. However, the current collecting lead is connected without an increase in size in the laminating direction due to, for example, insertion of a lead layer for connecting the current collecting lead. When the battery cells which are laminated in the laminated battery have a flat plate-shape, the increase in size in the laminating direction significantly influences an increase in the volume of the laminated battery. Therefore, by connecting the current collecting lead to the exposed surface, an increase in size in the laminating direction due to a layer that does not contribute to the battery capacity can be prevented, so that the battery capacity density of the laminated battery is improved. Since the side surface of the second battery cell is inclined with respect to the laminating direction, the distance between the positive electrode current collector and the negative electrode current collector along the inclined surface can be larger than the distance between the positive electrode current collector and the negative electrode current collector in the laminating direction, i.e., the distance between the positive electrode current collector and the negative electrode current collector along the side surface when the side surface is not inclined. Therefore, the possibility of a short circuit due to contact between the positive electrode current collector and the negative electrode current collector on the side surface can be reduced, so that the reliability of the laminated battery is improved.

When viewed from the laminating direction of the plurality of battery cells, the entire exposed surface may overlap part or all of the inclined surface of the second battery cell. The first battery cell and the second battery cell may be disposed so as to be displaced from each other in a direction perpendicular to the laminating direction. In this case, when viewed from the laminating direction of the plurality of battery cells, the exposed surface may include a portion that does not overlap the second battery cell and a portion that overlaps part or all of the inclined side surface of the second battery cell.

For example, the sum of a thickness of the current collecting lead in the laminating direction and a thickness of the first battery cell in the laminating direction at a position at which the exposed surface and the side surface overlap each other when viewed from the laminating direction may be smaller than the thickness of the first battery cell in the laminating direction at a position at which the exposed surface and the side surface do not overlap each other when viewed from the laminating direction.

In this case, the second battery cell can be laminated on the upper side of the current collecting lead connected to the exposed surface without contacting the current collecting lead. Specifically, even when the current collecting lead overlaps the inclined surface of the second battery cell when viewed from the laminating direction, the current collecting lead is not in contact with the inclined surface of the second battery cell. Therefore, restrictions on the laminating shape of the laminated battery are small, so that the laminated battery can have a laminating shape with better volumetric efficiency.

For example, a thickness of the current collecting lead in the laminating direction at a position at which the current collecting lead overlaps the exposed surface when viewed from the laminating direction may be larger than a thickness of the positive electrode current collector included in the second battery cell in the laminating direction or a thickness of the negative electrode current collector included in the second battery cell in the laminating direction.

In this case, since the thickness of the current collecting lead is larger than the thickness of the current collector, the allowable current of the current collecting lead is large. Therefore, even when charging or discharging is performed using a large current, a reduction in the battery characteristics can be reduced.

For example, the plurality of battery cells may be electrically connected in parallel or series.

In this case, when the laminated battery is of the parallel connection type, the laminated battery can be stably charged or discharged using current collecting leads. When the laminated battery is of the series connection type, the laminated battery can be safely charged or discharged while the voltage of each of the battery cells which are laminated is monitored using the current collecting leads.

For example, the plurality of battery cells may be laminated such that peripheral parts of the plurality of battery cells are aligned with each other when viewed from the laminating direction.

In this case, since the peripheral parts of the battery cells are aligned with each other, an increase in the apparent volume of the laminated battery due to the formation of the exposed surface can be reduced, Therefore, the battery capacity density of the laminated battery is further improved.

For example, side surfaces of the plurality of battery cells may be inclined in the same direction with respect to the laminating direction.

In this case, the orientations of the side surfaces of the battery cells are the same. Therefore, when, for example, a sealing member is applied to the side surfaces, the sealing member can be applied from the same direction, and post workability is improved.

For example, the plurality of battery cells may have the same shape.

In this case, it is unnecessary to produce battery cells with different shapes. Moreover, since the side surfaces of the battery cells are inclined with respect to the laminating direction, exposed surfaces are formed by simply laminating the battery cells such that they are oriented in the same direction with their peripheral parts aligned with each other. Therefore, the laminated battery is produced easily.

For example, the exposed surface of the first battery cell and the second battery cell may be joined together through a joint portion including an electrically conductive material.

In this case, the mechanical bonding and electrical bonding between the sacked battery cells are more firmly established, and the connection impedance between the battery cells is small. Therefore, the generation of heat is reduced, and the laminated battery has improved large-current characteristics.

Embodiments of the present disclosure will next be described with reference to the drawings.

The embodiments described below show general or specific examples. Numerical values, shapes, materials, components, arrangements and connections of the components, steps, the order of the steps, etc. shown in the following embodiments are merely examples and are not intended to limit the present disclosure. Among the components in the following embodiments, components not described in an independent claim will be described as optional components.

The drawings are schematic drawings and are not necessarily strictly accurate illustrations. Therefore, the scales etc. in the drawings do not always coincide with each other. In the drawings, the same reference numerals are given to substantially the same components, and redundant description thereof will be omitted or simplified.

In the present specification, terms, such as parallel, representing the relations between components, terms, such as rectangular, representing the shapes of components, and numerical ranges do not represent only their strict meanings but are intended to include those in substantially the same range, e.g., with a few percent difference.

In the present specification and the drawings, x, y, and z axes are the three axes of a three-dimensional orthogonal coordinate system. In each embodiment, the z axis direction is the laminating direction of the laminated battery. In the present specification, "the thicknesses" of the battery cells, the current collecting lead, the current collectors, and each layer are their lengths in the laminating direction. In the present specification, "the top view" means that the laminated battery is viewed from the laminating direction of the battery cells in the laminated battery. In the present specification, "the side surface" is a surface intersecting a direction perpendicular to the laminating direction of the laminated battery. "The side surface inclined with respect to the laminating direction" may be, for example, a surface inclined from a surface substantially parallel to the laminating direction of the laminated battery with respect to the laminating direction. In the present specification, "the laminating surface" is a surface intersecting the laminating direction. "The laminating surface" may be, for example, a surface substantially perpendicular to the laminating direction of the laminated battery.

In the present specification, the terms "above" and "below" in the structure of the laminated battery do not refer to an upward direction (vertically above) and a downward direction (vertically below), respectively, in space recognition in an absolute manner but are used to define relative positional relations based on the laminating order in the laminated structure. The terms "above" and "below" are used not only when two components are disposed with a space therebetween and another component is present between the two components but also when two components are disposed in contact with each other.

Embodiment 1

FIGS. 1A and 1B are illustrations showing a schematic structure of a laminated battery 1000 in embodiment 1. Specifically, FIG. 1A is a top view showing the schematic structure of the laminated battery 1000, and the shapes of components of the laminated battery 1000 in plan view when the laminated battery 1000 is viewed from above in the laminating direction are represented by solid or broken lines. FIG. 1B is a cross-sectional view showing the schematic structure of the laminated battery 1000 and shows a cross section at a position represented by line IB-IB in FIG. 1A.

As shown in FIGS. 1A and 1B, the laminated battery 1000 in embodiment 1 includes a plurality of battery cells 2000 and 2100, and the plurality of battery cells 2000 and 2100 are electrically connected in parallel to thereby form the laminated battery 1000. The laminated battery 1000 further includes current collecting leads 500.

Each of the battery cells 2000 and 2100 includes a negative electrode current collector 210, a negative electrode active material layer 110, a solid electrolyte layer 130, a positive electrode current collector 220, and a positive electrode active material layer 120.

The negative electrode active material layer 110 and the positive electrode current collector 220 face each other with the solid electrolyte layer 130 therebetween.

In each of the battery cells 2000 and 2100, the positive electrode current collector 220, the positive electrode active material layer 120, the solid electrolyte layer 130, the negative electrode active material layer 110, and the negative electrode current collector 210 are laminated in this order when the laminated battery 1000 is viewed from above or below in the laminating direction of the battery cells 2000 (the z axis direction). The battery cells 2000 and the battery cells 2100 have the same shape. In the cross-sectional laminating structure of the battery cells 2000, the orientation of the electrodes is opposite to that in the cross-sectional laminating structure of the battery cells 2100. The negative electrode current collector 210, the negative electrode active material layer 110, the solid electrolyte layer 130, the positive electrode current collector 220, and the positive electrode active material layer 120 each have a rectangular shape in top view. The laminated battery 1000 has a structure in which the battery cells 2000 and the battery cells 2100 are laminated alternately such that the positive electrode current collectors 220 or the negative electrode current collectors 210 of two adjacent battery cells 2000 and 2100 are in contact with each other. In this case, the laminated battery 1000 is a parallel laminated battery in which the plurality of battery cells 2000 and 2100 are electrically connected in parallel.

The negative electrode active material layers 110 contain, for example, a negative electrode active material as an electrode material. Each negative electrode active material layer 110 is disposed so as to face a corresponding positive electrode active material layer 120.

The negative electrode active material contained in the negative electrode active material layer 110 is, for example, a negative electrode active material such as graphite or metallic lithium. The material used for the negative electrode active material may be any of various materials capable of releasing and occluding ions such as lithium (Li) or magnesium (Mg) ions.

A solid electrolyte such as an inorganic solid electrolyte may be used as a constituent material of the negative electrode active material layer 110. The inorganic solid electrolyte used may be a sulfide solid electrolyte or an oxide solid electrolyte. The sulfide solid electrolyte used may be, for example, a mixture of lithium sulfide ($Li_2S$) and diphosphorus pentasulfide ($P_2S_5$). A conductive material such as acetylene black, carbon black, graphite, or carbon fibers or a binder such as polyvinylidene fluoride may be used as a constituent material of the negative electrode active material layer 110.

The negative electrode active material layer 110 may be produced, for example, by kneading the constituent materials of the negative electrode active material layer 110 with a solvent to prepare a past-like coating material, applying the coating material to the surface of the negative electrode current collector 210, and drying the applied coating material. To increase the density of the negative electrode active material layer 110, an electrode plate including the negative electrode active material layer 110 and the negative electrode current collector 210 may be pressed after drying. The thickness of the negative electrode active material layer 110 is, for example, equal to or more than 5 μm and equal to or less than 300 μm, but this is not a limitation.

Each positive electrode active material layer 120 is a layer containing a positive electrode material such as an active material. The positive electrode material is a material forming a counter electrode for the negative electrode material. The positive electrode active material layer 120 contains, for example, a positive electrode active material.

The positive electrode active material contained in the positive electrode active material layer 120 may be a positive electrode active material such as lithium cobaltate complex oxide (LCO), lithium nickelate complex oxide (LNO), lithium manganate complex oxide (LMO), lithium-manganese-nickel complex oxide (LMNO), lithium-manganese-cobalt complex oxide (LMLO), lithium-nickel-cobalt complex oxide (LNCO), or lithium-nickel-manganese-cobalt complex oxide (LNMCO).

The material used for the positive electrode active material may be any of various materials capable of releasing and occluding ions such as Li or Mg ions.

A solid electrolyte such as an inorganic solid electrolyte may be used as a constituent material of the positive electrode active material layer 120. The inorganic solid electrolyte used may be a sulfide solid electrolyte or an oxide solid electrolyte. The sulfide solid electrolyte used may be, for example, a mixture of lithium sulfide ($Li_2S$) and diphosphorus pentasulfide ($P_2S_5$). The surface of the positive electrode active material may be coated with a solid electrolyte. A conductive material such as acetylene black, carbon black, graphite, or carbon fibers or a binder such as polyvinylidene fluoride may be used as a constituent material of the positive electrode active material layer 120.

The positive electrode active material layer 120 may be produced, for example, by kneading the constituent materials of the positive electrode active material layer 120 with a solvent to prepare a past-like coating material, applying the coating material to the surface of the positive electrode current collector 220, and drying the applied coating material. To increase the density of the positive electrode active material layer 120, an electrode plate including the positive electrode active material layer 120 and the positive electrode current collector 220 may be pressed after drying. The thickness of the positive electrode active material layer 120 is, for example, equal to or more than 5 µm and equal to or less than 300 µm, but this is not a limitation.

The solid electrolyte layer 130 is disposed between the negative electrode active material layer 110 and the positive electrode active material layer 120. The solid electrolyte layer 130 is in contact with each of the negative electrode active material layer 110 and the positive electrode active material layer 120. The solid electrolyte layer 130 is a layer containing an electrolyte material. The electrolyte material used may be a well-known electrolyte for batteries. The thickness of the solid electrolyte layer 130 may be equal or more than 5 µm and equal to or less than 300 µm or may be equal or more than 5 µm and equal to or less than 100 µm.

The solid electrolyte layer 130 may contain a solid electrolyte. Each of the battery cells 2000 and 2100 may be, for example, an all-solid-state electric cell.

The solid electrolyte used may be a solid electrolyte such as an inorganic solid electrolyte. The inorganic solid electrolyte used may be a sulfide solid electrolyte, an oxide solid electrolyte, or a halide solid electrolyte. The sulfide solid electrolyte used may be, for example, a mixture of lithium sulfide ($Li_2S$) and diphosphorus pentasulfide ($P_2S_5$). The solid electrolyte layer 130 may contain, in addition to the electrolyte material, a binder such as polyvinylidene fluoride.

The solid electrolyte layer 130 may be produced, for example, by kneading the constituent materials of the solid electrolyte layer 130 with a solvent to prepare a past-like coating material, applying the coating material to the negative electrode active material layer 110 formed on the negative electrode current collector 210 and/or the positive electrode active material layer 120 formed on the positive electrode current collector 220, and drying the applied coating material. Alternatively, the solid electrolyte layer 130 may be formed by applying the coating material to a carrier film such as a PET film, drying the applied coating material, and transferring the dried coating material onto the negative electrode active material layer 110 formed on the negative electrode current collector 210 and/or the positive electrode active material layer 120 formed on the positive electrode current collector 220 to laminate the dried coating material thereon.

In each of the battery cells 2000 and 2100 in embodiment 1, the negative electrode active material layer 110, the positive electrode active material layer 120, and the solid electrolyte layer 130 are flat plates held parallel to each other. In this case, the occurrence of cracking or collapse due to bending can be prevented. The negative electrode active material layer 110, the positive electrode active material layer 120, and the solid electrolyte layer 130 may be smoothly bent together.

The negative electrode current collector 210 and the positive electrode current collector 220 are each an electrically conductive member. The negative electrode current collector 210 and the positive electrode current collector 220 may each be an electrically conductive thin film. The material used to form the negative electrode current collector 210 and the positive electrode current collector 220 may be a metal such as stainless steel (SUS), aluminum (Al), or copper (Cu).

The negative electrode current collector 210 is disposed in contact with the negative electrode active material layer 110. The negative electrode current collector 210 used may be a metal foil such as a SUS foil or a Cu foil. The thickness of the negative electrode current collector 210 is, for example, equal to or more than 5 µm and equal to or less than 100 µm, but this is not a limitation. For example, a current collector layer that is a layer containing an electrically conductive material may be disposed on a portion of the negative electrode current collector 210 that is in contact with the negative electrode active material layer 110.

The positive electrode current collector 220 is disposed in contact with the positive electrode active material layer 120. The positive electrode current collector 220 used may be a metal foil such as a SUS foil or an Al foil. The thickness of the positive electrode current collector 220 is, for example, equal to or more than 5 µm and equal to or less than 100 µm, but this is not a limitation. For example, a current collector layer that is a layer containing an electrically conductive material may be disposed on a portion of the positive electrode current collector 220 that is in contact with the positive electrode active material layer 120.

As shown in FIGS. 1A and 1B, the laminated battery 1000 in embodiment 1 has a structure in which the plurality of battery cells 2000 and 2100 are laminated. The side surfaces 350 of the battery cells 2000 and 2100 are inclined with respect to the normal to a laminating principal surface (the laminating direction, the z-axis direction) such that their portions on the upper side in the laminating direction (the positive z-axis direction) are smaller. In each of the battery cells 2000 and 2100, the area of the positive electrode current collector 220 differs from the area of the negative electrode current collector 210 when the laminated battery 1000 is viewed from the laminating direction. The side surfaces 350 of each battery cell 2000 are linearly inclined such that the edges of the positive electrode current collector 220 are located inside the edges of the negative electrode current collector 210 when the laminated battery 1000 is viewed from the laminating direction. The side surfaces 350 of each battery cell 2100 are inclined such that the edges of the negative electrode current collector 210 are located inside the edges of the positive electrode current collector 220 when the laminated battery 1000 is viewed from the laminating direction. Side surfaces 350 of the plurality of battery cells 2000 and 2100 on the same side are inclined in the same direction with respect to the laminating direction.

The plurality of battery cells 2000 and 2100 shown in FIG. 1B have the same shape, and their cross-section has a trapezoidal shape. In the laminated battery 1000, all the side surfaces 350 are inclined with respect to the laminating direction, but it is unnecessary that all the side surfaces 350 be inclined.

As shown in FIGS. 1A and 1B, one battery cell 2000 or 2100 of two adjacent battery cells 2000 and 2100 included in the plurality of battery cells 2000 and 2100 (this battery cell is hereinafter referred to a first battery cell) has an exposed surface 300 not in contact with the other battery cell 2000 or 2100 on a surface facing the other battery cell 2000 or 2100 (this battery cell is hereinafter referred to as a second battery cell). Specifically, the negative electrode current collector 210 of each of the battery cells 2000 except for the lowermost battery cell 2000 has an exposed surface 300 that is not in contact with a battery cell 2100 adjacent to the negative electrode current collector 210. The positive electrode current collector 220 of each of the battery cells 2100 has an exposed surface 300 that is not in contact with a battery cell 2000 adjacent to the positive electrode current collector 220.

FIG. 1B is a schematic cross-sectional view showing an example of part of the laminated battery 1000 in which the plurality of battery cells 2000 and 2100 having the same shape and having side surfaces 350 inclined with respect to the normal to the laminating principal surface (the laminating direction, the z-axis direction) are laminated such that the peripheral parts of the battery cells are aligned with each other when the laminated battery 1000 is viewed from the laminating direction.

By laminating the plurality of battery cells 2000 and 2100 having the side surfaces 350 and having the same shape such that the peripheral parts of the battery cells are aligned with each other, the exposed surfaces 300 are formed. A laminating space 400 in which no battery cells 2000 and 2100 are present is formed on each exposed surface 300.

Current collecting leads 500 are connected to the respective exposed surfaces 300 of the negative electrode current collectors 210 or the positive electrode current collector 220 of the battery cells 2000 and 2100 by utilizing the laminating spaces 400. The current collecting leads 500 are lead wires used for, for example, charging/discharging and monitoring of the voltage between terminals. In the laminated battery 1000 including the plurality of battery cells 2000 and 2100 electrically connected in parallel, the current collecting leads 500 are mainly used for charging/discharging. In FIGS. 1A and 1B, the current collecting leads 500 each have a flat plate shape. However, no particular limitation is imposed on the shape of the current collecting leads 500, and the current collecting leads 500 may have another shape such as a cylindrical shape. The thickness of each current collecting lead 500 is smaller than the thickness of a battery cell 2000 or 2100 adjacent to the exposed surface 300 of a corresponding battery cell 2000 or 2100 to which the each current collecting lead 500 is connected. In this manner, even when the battery cells 2000 are laminated such that their peripheral parts are aligned with each other as shown in FIG. 1B, the current collecting leads 500 are connected to the exposed surfaces 300 without being impeded by the battery cells 2000 and 2100. The thickness of the current collecting leads 500 is larger than the thicknesses of the positive electrode current collectors 220 and the negative electrode current collectors 210. In this case, the allowable current of the current collecting leads 500 is large, so that a reduction in the battery characteristics can be small. The thickness of the current collecting leads 500 is the length of the current collecting leads 500 in the laminating direction.

A metal such as nickel, stainless steel, aluminum, or copper can be used as the material forming the current collecting leads 5001. No particular limitation is imposed on the method for connecting the current collecting leads 500, and a method such as bonding or welding can be used. Each current collecting lead 500 may be connected to a corresponding current collector using an electrically conductive adhesive or bonding tape. To prevent a short circuit, portions of the current collecting leads 500 that are not connected to the current collectors may be subjected to surface insulation treatment.

The method for connecting the current collecting leads 500 using the laminating spaces 400 on the exposed surfaces 300 has an advantage in that the current collecting leads 500 can be connected without an increase in size in the laminating direction due to, for example, insertion of lead layers that are used for connecting the current collecting leads and do not contribute to the battery capacity. It is necessary to provide spaces extending in in-plane directions of the laminating surfaces and corresponding to the laminating spaces 400 on the exposed surfaces 300. Specifically, since the battery cells 2000 and 2100 have the exposed surfaces 300, the laminating spaces 400 that do not function as cells are formed, so that the effective volume of the laminated battery 1000 decreases. However, in particular, when the size of the laminated battery is large, it is important to reduce the increase in size in the laminating direction due to the layers that do not contribute to the battery capacity in order to allow the laminated battery to have sufficient battery capacity density, and the influence of the small spaces extending in the in-plane directions of the laminating surfaces on the battery capacity density is smaller than the influence of an increase in size in the laminating direction on the battery capacity density. The smaller the ratio of the thickness in the laminating direction to the side length in an in-plane direction of the laminating surfaces, the more effective the laminated battery 1000 in the present embodiment. Since the current collecting leads 500 thicker than the current collectors can be connected directly to the current collectors without an increase in size in the laminating direction, the resistance loss and heat generation during charging/discharging are small, and the parallel laminated battery obtained is also excellent in large-current characteristics.

Since the side surfaces 350 of the battery cells 2000 and 2100 are inclined with respect to the normal to the laminating principal surface (the laminating direction, the z-axis direction), the exposed surfaces 300 can be easily formed by aligning the peripheral parts of the plurality of battery cells 2000 and 2100 when viewed from the laminating direction. Since the side surface 350 of each of the battery cells 2000 and 2100 are inclined with respect to the normal to the laminating principal surface (the laminating direction, the z-axis direction), the distance between the positive electrode current collector 220 and the negative electrode current collector 210 along each side surface 350 can be larger than the distance between the positive electrode current collector 220 and the negative electrode current collector 210 in the laminating direction (the z-axis direction), so that the risk of a short circuit on the side surfaces 350 can be significantly reduced.

In the laminated battery 1000 shown in FIGS. 1A and 1B, the width (the width in the x-axis direction) of exposed surfaces 300 to which the current collecting leads 500 are connected is preferably 0.2 mm or more from the viewpoint of, for example, obtaining the regions for connecting the current collecting leads 500. From the viewpoint of obtaining sufficient battery capacity, the ratio of the width of the exposed surfaces 300 to the width of the battery cells 2000 in the x-axis direction is preferably 5% or less and may be 1% or less.

No particular limitation is imposed on the angle of each side surface 350 with respect to the laminating direction, and the angle may be set according to, for example, the size of the laminated battery 1000 or the intended width of the exposed surface 300. From the viewpoint of increasing the distance between the positive electrode current collector 220 and the negative electrode current collector 210 along the side surface 350, the angle is preferably equal to or more than 30 degrees. From the viewpoint of allowing the volume of the positive electrode active material layer 120 or the negative electrode active material layer 110 that contributes to the battery capacity to be sufficiently large, the angle of the side surface 350 with respect to the laminating direction is preferably equal to or less than 60 degrees.

Each of the battery cells 2000 and 2100 having the side surfaces 350 inclined with respect to the laminating direction is produced, for example, by the following method. First, the positive electrode current collector 220, the positive electrode active material layer 120, the solid electrolyte layer 130, the negative electrode active material layer 110, and the negative electrode current collector 210 are laminated in this order such that their positions and shapes when they are viewed from the laminating direction are the same. In this manner, an unprocessed battery cell with the side surfaces not inclined with respect to the laminating direction is obtained. The unprocessed battery cell may be pressed from the outer sides of the positive electrode current collector 220 and the negative electrode current collector 210. The resulting unprocessed battery cell is cut using a blade, a drill, or a laser beam such that the side surfaces of the battery cell are inclined with respect to the laminating direction, and a battery cell 2000 or 2100 having the side surfaces 350 inclined with respect to the laminating direction is thereby obtained.

The laminated battery 1000 is produced, for example, by the following method (1). The current collecting leads 500 are connected to portions of the battery cells 2000 and 2100 that later become the exposed surfaces 300 in advance. Then the battery cells 2000 and 2100 including the current collecting leads 500 connected thereto are laminated such that the laminating structure shown in FIGS. 1A and 1B is obtained. Specifically, the battery cells 2000 and 2100 are laminated such that the peripheral parts of the battery cells 2000 and 2100 are aligned with each other when they are viewed from the laminating direction. Alternatively, the laminated battery 1000 may be produced by the following method (2). The plurality of battery cells 2000 and 2100 are laminated such that the laminating structure shown in FIGS. 1A and 1B is obtained. Specifically, the battery cells 2000 and 2100 are laminated such that the peripheral parts of the battery cells 2000 and 2100 are aligned with each other when they are viewed from the laminating direction. After all the battery cells 2000 and 2100 have been laminated, the current collecting leads 500 are connected to the respective exposed surfaces 300 formed. Alternatively, the laminated battery 1000 may be produced by the following method (3). A battery cell 2000 or 2100 is laminated onto previously battery cells 2000 and 2100 such that the peripheral parts of the battery cells 2000 and 2100 are aligned with each other when they are viewed from the laminating direction. Then a current collecting lead 500 is connected to the exposed surface 300 of the last battery cell 2000 or 2100. The above procedure is repeated, and the laminating structure shown in FIGS. 1A and 1B is thereby formed.

A method suitable for the intended laminating structure may be selected from the methods (1) to (3), or a combination of the methods (1) to (3) may be used to produce the laminated battery 1000. For example, in the case of a laminating structure in which it is difficult to connect the current collecting leads 500 to the exposed surfaces 300 after laminating of the battery cells 2000 and 2100, the laminated battery 1000 is produced using the method (1). In the case of a laminating structure in which the current collecting leads 500 can be easily connected to the exposed surfaces 300 even after laminating of the battery cells 2000 and 2100, the laminated battery 1000 is produced using the method (2) or (3).

The laminated battery 1000 may be enclosed in a sealing case. The sealing case used may be, for example, a lamination bag, a metal can, a resin case, etc., but this is not a limitation. By sealing the laminated battery 1000, deterioration of the laminated battery 1000 by moisture can be prevented.

(Modifications)

A plurality of modifications of embodiment 1 will next be described. In the following description of the plurality of modifications, differences from embodiment 1 or differences between the modifications will be mainly described, and the description of common features will be omitted or simplified.

[Modification 1]

Figure 2B:
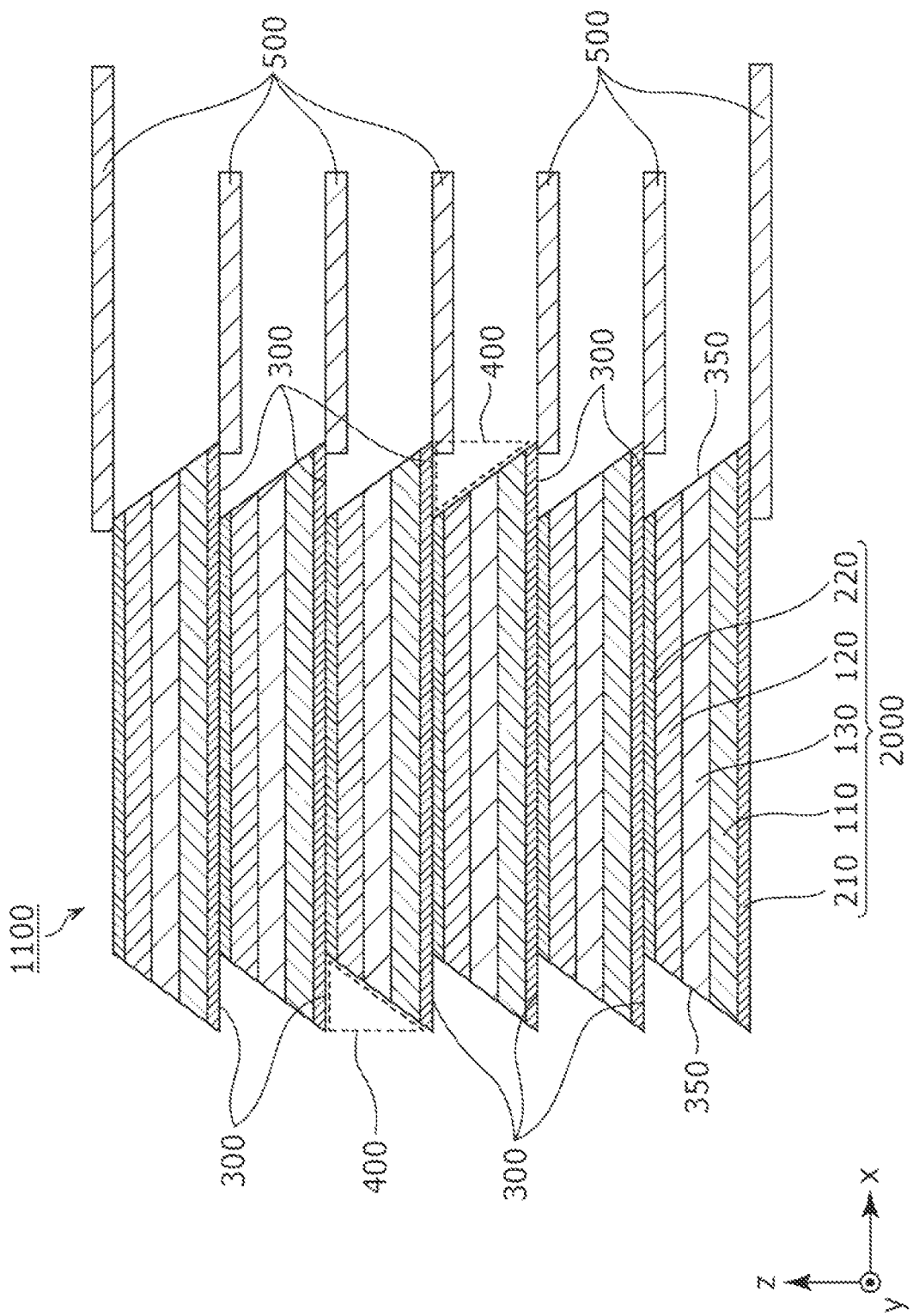
FIG. 2B is a cross-sectional view showing the schematic structure of the laminated battery in modification 1 of embodiment 1.

FIGS. 2A and 2B are illustrations showing a schematic structure of a laminated battery 1100 in modification 1 of embodiment 1.

As shown in FIGS. 2A and 2B, the laminated battery 1100 in modification 1 of embodiment 1 includes a plurality of battery cells 2000, and the plurality of battery cells 2000 are electrically connected in series to thereby form the laminated battery 1100. The laminated battery 1100 differs from the laminated battery 1000 in embodiment 1 in that the plurality of battery cells 2000 are electrically connected in series. Since the battery cells 2000 are connected in series, the battery cells 2100 whose electrode orientation is opposite to that of the battery cells 2000 are not included.

Each of the battery cells 2000 includes a negative electrode current collector 210, a negative electrode active material layer 110, a solid electrolyte layer 130, a positive electrode current collector 220, and a positive electrode active material layer 120.

Each of the battery cells 2000 has a structure in which the positive electrode current collector 220, the positive electrode active material layer 120, the solid electrolyte layer 130, the negative electrode active material layer 110, and the negative electrode current collector 210 are laminated in this order in the laminating direction of the battery cells 2000 (the z-axis direction). In the laminated battery 1100, two adjacent battery cells 2000 are laminated such that the positive electrode current collector 220 of the first battery cell 2000 is in contact with the negative electrode current collector 210 of the second battery cell 2000. In this case, the laminated battery 1100 is a series laminated battery in which the plurality of battery cells 2000 are electrically connected in series.

As shown in FIGS. 2A and 2B, a first battery cell 2000 among two adjacent battery cells 2000 included in the plurality of battery cells 2000 has an exposed surface 300 not in contact with the second battery cell 2000 on a surface facing the second battery cell 2000. Specifically, the negative electrode current collector 210 of each of the battery cells 2000 except for the lowermost battery cell 2000 has an exposed surface 300 that is not in contact with a battery cell 2000 adjacent to the each of the battery cells 2000.

FIG. 2B is a schematic cross-sectional view showing an example of part of the laminated battery 1100 in which the plurality of battery cells 2000 having the same shape and having side surfaces 350 inclined with respect to the normal to the laminating principal surface (the laminating direction, the z-axis direction) are laminated such that the peripheral parts of the battery cells are aligned with each other, as in embodiment 1.

By laminating the plurality of battery cells 2000 having the side surfaces 350 and having the same shape such that the peripheral parts of the battery cells are aligned with each other, the exposed surfaces 300 are formed. A laminating space 400 in which no battery cell 2000 is present is formed on each exposed surface 300.

Current collecting leads 500 are connected to the respective exposed surfaces 300 of the negative electrode current collectors 210 or the positive electrode current collector of the battery cells 2000 by utilizing the laminating spaces 400. In the laminated battery 1100 including the plurality of battery cells 2000 electrically connected in series, the current collecting leads 500 are used mainly to monitor the voltage between terminals.

This method for connecting the current collecting leads 500 using the laminating spaces 400 on the exposed surfaces has an advantage in that the current collecting leads 500 can be connected without an increase in size in the laminating direction due to, for example, insertion of lead layers that are used for connecting the current collecting leads and do not contribute to the battery capacity, as in embodiment 1. It is necessary to provide spaces extending in in-plane directions of the laminating surfaces and corresponding to the laminating spaces 400 on the exposed surfaces 300. Specifically, since the battery cells 2000 have the exposed surfaces 300, the laminating spaces 400 that do not function as cells are formed, so that the effective volume of the laminated battery 1100 decreases. However, in particular, when the size of the laminated battery is large, it is important to reduce the increase in size in the laminating direction due to the layers that do not contribute to the battery capacity in order to allow the laminated battery to have sufficient battery capacity density, and the influence of the small spaces extending in the in-plane directions of the laminating surfaces on the battery capacity density is smaller than the influence of an increase in size in the laminating direction on the battery capacity density. The smaller the ratio of the thickness in the laminating direction to the side length in an in-plane direction of the laminating surfaces, the more effective the laminated battery 1100 in the present embodiment. Since the inter-terminal voltage between battery cells 2000 can be monitored without an increase in size in the laminating direction, the high-capacity series connected laminated battery obtained can be excellent in safety.

[Modification 2]

Figure 3:
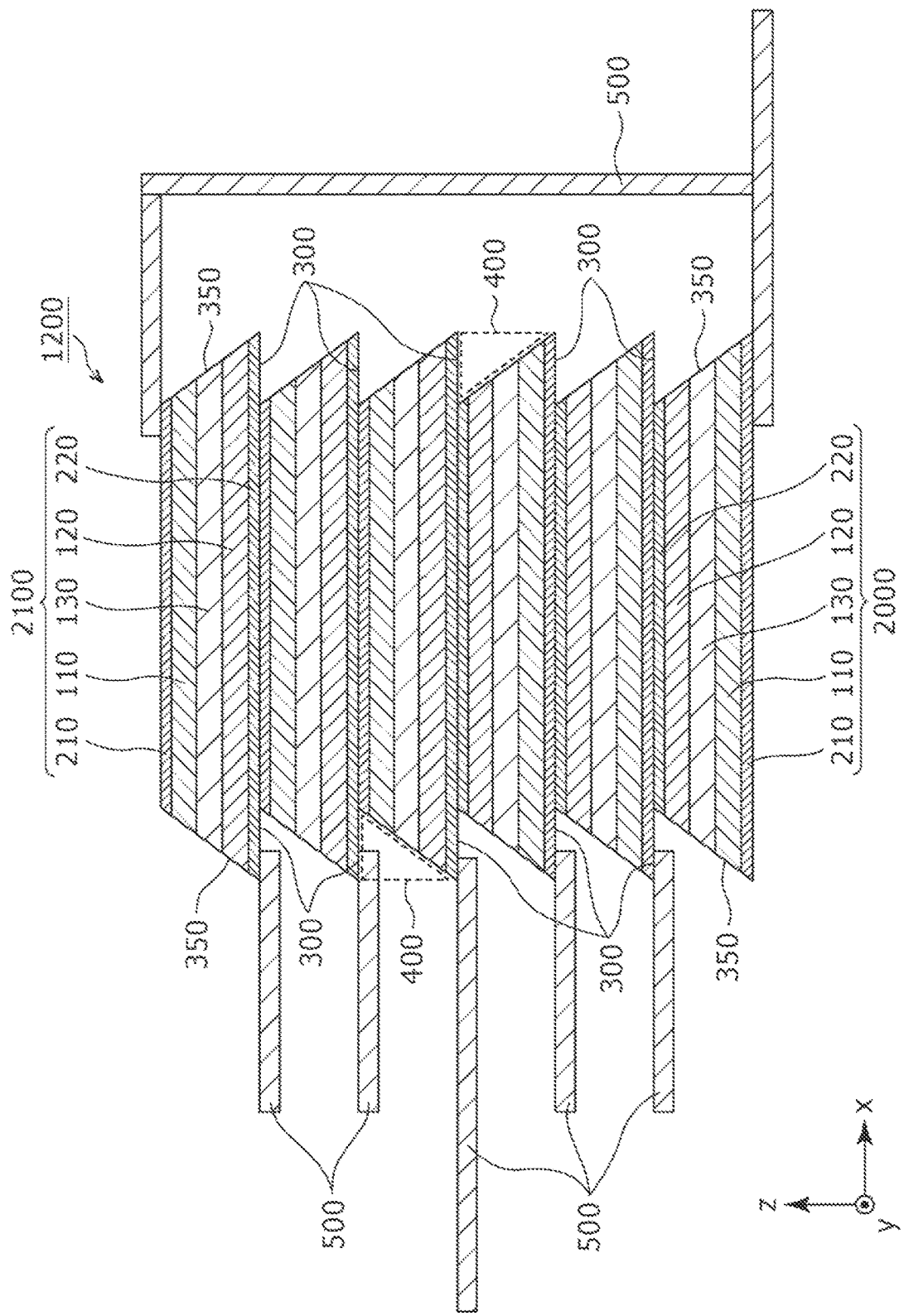
FIG. 3 is a cross-sectional view showing a schematic structure of a laminated battery in modification 2 of embodiment 1.

FIG. 3 is a cross-sectional view showing a schematic structure of a laminated battery 1200 in modification 2 of embodiment 1.

As shown in FIG. 3, the laminated battery 1200 in modification 2 of embodiment 1 includes a plurality of battery cells 2000 and 2100, and the plurality of battery cells 2000 and 2100 are electrically connected to form the laminated battery 1200. The laminated battery 1200 differs from the laminated battery 1000 in embodiment 1 in that the plurality of battery cells 2000 and 2100 are electrically connected in a combination of parallel and series connections, Therefore, the laminating order of the plurality of battery cells 2000 and 2100 in the laminated battery 1200 differs from that in the laminated battery 1000.

Each of the battery cells 2000 and 2100 includes a negative electrode current collector 210, a negative electrode active material layer 110, a solid electrolyte layer 130, a positive electrode current collector 220, and a positive electrode active material layer 120.

In FIG. 3, the plurality of battery cells 2000 and 2100 are electrically connected in a combination of parallel and series connections. In a portion in which two battery cells 2000 are adjacent to each other and a portion in which two battery cells 2100 are adjacent to each other, the battery cells are laminated such that a positive electrode current collector 220 is in contact with a negative electrode current collector 210, so that the battery cells are connected in series. In a portion in which a battery cell 2000 is adjacent to a battery cell 2100, they are laminated such that their negative electrode current collectors 210 or their positive electrode current collector 220 are in contact with each other, so that the battery cells are connected in parallel.

Among two adjacent battery cells 2000 and/or 2100 included in the plurality of battery cells 2000 and 2100, the first battery cell 2000 or 2100 has an exposed surface 300 not in contact with the second battery cell 2000 or 2100 on a surface facing the second battery cell 2000 or 2100, as shown in FIG. 3. Specifically, the negative electrode current collector 210 of each of the battery cells 2000 except for the lowermost battery cell 2000 has an exposed surface 300 that is not in contact with a battery cell 2000 adjacent to the negative electrode current collector 210. The positive electrode current collector 220 of each of the battery cells 2100 has an exposed surface 300 that is not in contact with a battery cell 2000 or 2100 adjacent to the positive electrode current collector 220.

FIG. 3 is a schematic cross-sectional view showing an example of part of the laminated battery 1200 in which the plurality of battery cells 2000 and 2100 having the same shape and having side surfaces 350 inclined with respect to the normal to the laminating principal surface (the laminating direction, the z-axis direction) are laminated such that the peripheral parts of the battery cells are aligned with each other, as in embodiment 1.

By laminating the plurality of battery cells 2000 and 2100 having the side surfaces 350 and having the same shape such that the peripheral parts of the battery cells are aligned with each other, the exposed surfaces 300 are formed. A laminating space 400 in which no battery cells 2000 and 2100 are present is formed on each exposed surface 300.

Current collecting leads 500 are connected to the respective exposed surfaces 300 of the negative electrode current collectors 210 or the positive electrode current collectors 220 of the battery cells 2000 and 2100 by utilizing the laminating spaces 400.

This method for connecting the current collecting leads 500 using the laminating spaces 400 on the exposed surfaces 300 has an advantage in that the current collecting leads 500 can be connected without an increase in size in the laminating direction due to, for example, insertion of lead layers that are used for connecting the current collecting leads and do not contribute to the battery capacity. It is necessary to provide spaces extending in in-plane directions of the laminating surfaces and corresponding to the laminating spaces 400 on the exposed surfaces 300. Specifically, since the battery cells 2000 and 2100 have the exposed surfaces 300, the laminating spaces 400 that do not function as cells are formed, so that the effective volume of the laminated battery 1200 decreases. However, in particular, when the size of the laminated battery is large, it is important to reduce the increase in size in the laminating direction due to the layers that do not contribute to the battery capacity in order to allow the laminated battery to have sufficient battery capacity density, and the influence of the small spaces extending in the in-plane directions of the laminating surfaces on the battery capacity density is smaller than the influence of an increase in size in the laminating direction on the battery capacity density. The smaller the ratio of the thickness in the laminating direction to the side length in an in-plane direction of the laminating surfaces, the more effective the laminated battery 1200 in the present embodiment. Since the current collecting leads 500 thicker than the current collectors can be connected directly to the current collectors, the high-capacity laminated battery obtained using a combination of parallel and series connections is excellent in large-current characteristics. Moreover, the inter-terminal voltage between battery cells can be monitored.

[Modification 3]

Figure 4B:
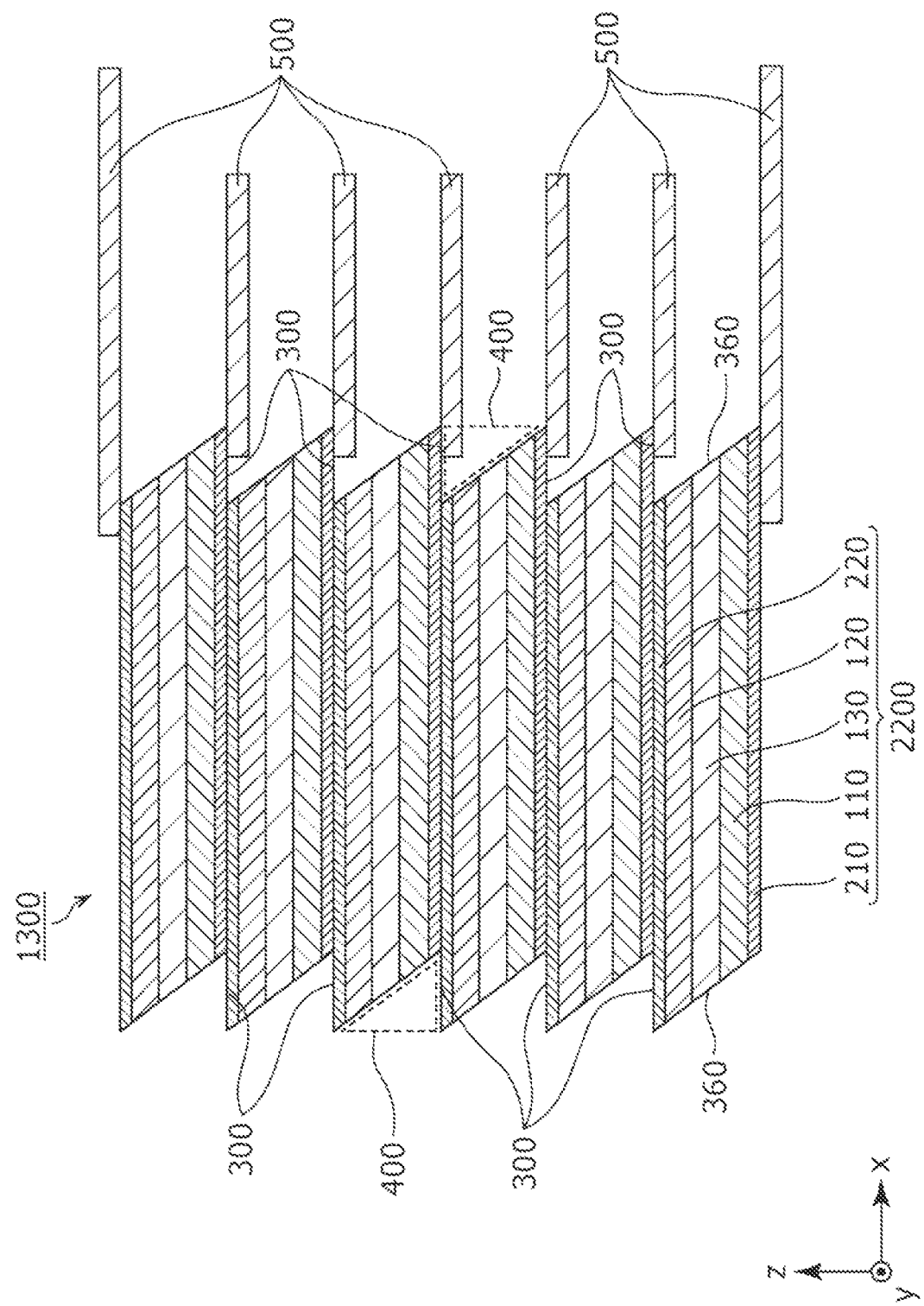
FIG. 4B is a cross-sectional view showing the schematic structure of the laminated battery in modification 3 of embodiment 1.

FIGS. 4A and 4B are illustrations showing a schematic structure of a laminated battery 1300 in modification 3 of embodiment 1. Specifically, FIG. 4A is a top view showing the schematic structure of the laminated battery 1300, and the shapes of components of the laminated battery 1300 in plan view when the laminated battery 1300 is viewed from above in the laminating direction are represented by solid or broken lines. FIG. 4B is a cross-sectional view showing the schematic structure of the laminated battery 1300 and shows a cross section at a position represented by line IVB-IVB in FIG. 4A.

As shown in FIGS. 4A and 4B, the laminated battery 1300 in modification 3 of embodiment 1 includes a plurality of battery cells 2200, and the plurality of battery cells 2200 are electrically connected in parallel to thereby form the laminated battery 1300. The laminated battery 1300 differs from the laminated battery 1100 in modification 1 of embodiment 1 in the shape of the battery cells which are laminated.

Each of the battery cells 2200 has a structure in which a positive electrode current collector 220, a positive electrode active material layer 120, a solid electrolyte layer 130, a negative electrode active material layer 110, and a negative electrode current collector 210 are laminated in this order in the laminating direction of the battery cells (the z-axis direction), as do the battery cells 2000 in embodiment 1.

As shown in FIGS. 4A and 4B, in the laminated battery 1300, the plurality of battery cells 2200 are laminated together, and two side surfaces 360 of each battery cell 2200 that are front surfaces when the laminated battery 1300 is viewed from the x-axis direction are inclined with respect to the normal to the laminating principal surface (the laminating direction, the z-axis direction). The plurality of battery cells 2200 have the same shape. In each battery cell 2200, the inclination angles of the two side surfaces 360 are the same, and the width in the x-axis direction is constant. The plurality of battery cells 2200 are laminated such that the peripheral parts of the plurality of battery cells 2200 are aligned with each other when the laminated battery 1300 is viewed from the laminating direction. The battery cells 2200 shown in FIG. 4B have a parallelogrammic cross-sectional shape.

As shown in FIGS. 4A and 4B, a first battery cell 2200 among two adjacent battery cells 2200 included in the plurality of battery cells 2200 has an exposed surface 300 not in contact with the second battery cell 2200 on a surface facing the second battery cell 2200. Specifically, the negative electrode current collector 210 of each of the battery cells 2200 except for the lowermost battery cell 2200 has an exposed surface 300 that is not in contact with a battery cell 2200 adjacent to the negative electrode current collector 210. The positive electrode current collector 220 of each of the battery cells 2200 except for the uppermost battery cell 2200 has an exposed surface 300 that is not in contact with a battery cell 2200 adjacent to the positive electrode current collector 220.

By laminating the plurality of battery cells 2200 having the side surfaces 360 and having the same shape such that the peripheral parts of the battery cells are aligned with each other, the exposed surfaces 300 are formed. A laminating space 400 in which no battery cell 2200 is present is formed on each exposed surface 300.

Current collecting leads 500 are connected to the respective exposed surfaces 300 of the negative electrode current collectors 210 or the positive electrode current collector of the battery cells 2200 by utilizing the laminating spaces 400.

Embodiment 2

Embodiment 2 will next be described. In the following description, differences from embodiment 1 and the modifications will be mainly described, and the description of common features will be omitted or simplified.

Figure 5:
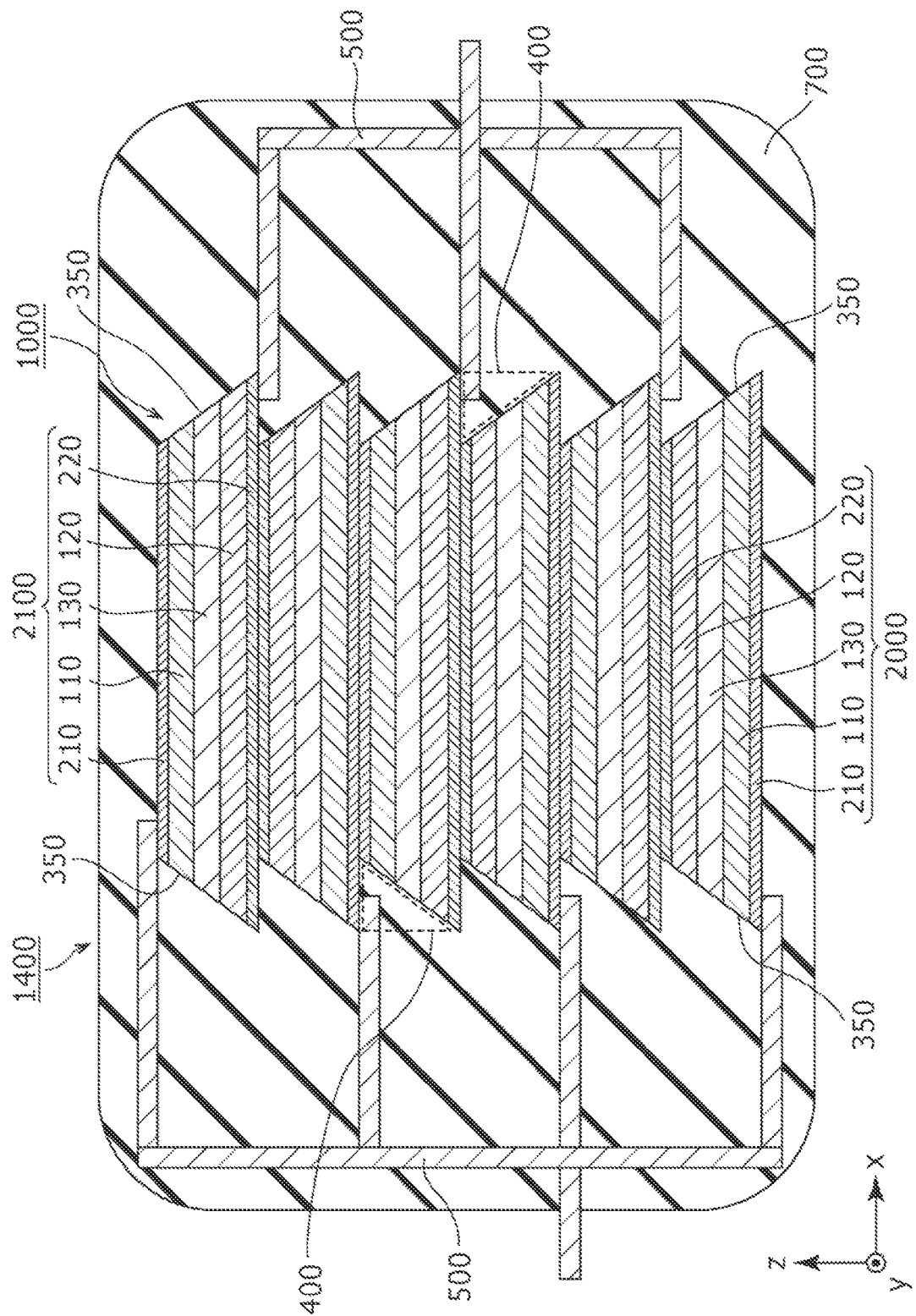
FIG. 5 is a cross-sectional view showing an example of a schematic structure of a laminated battery in embodiment 2.
Figure 6:
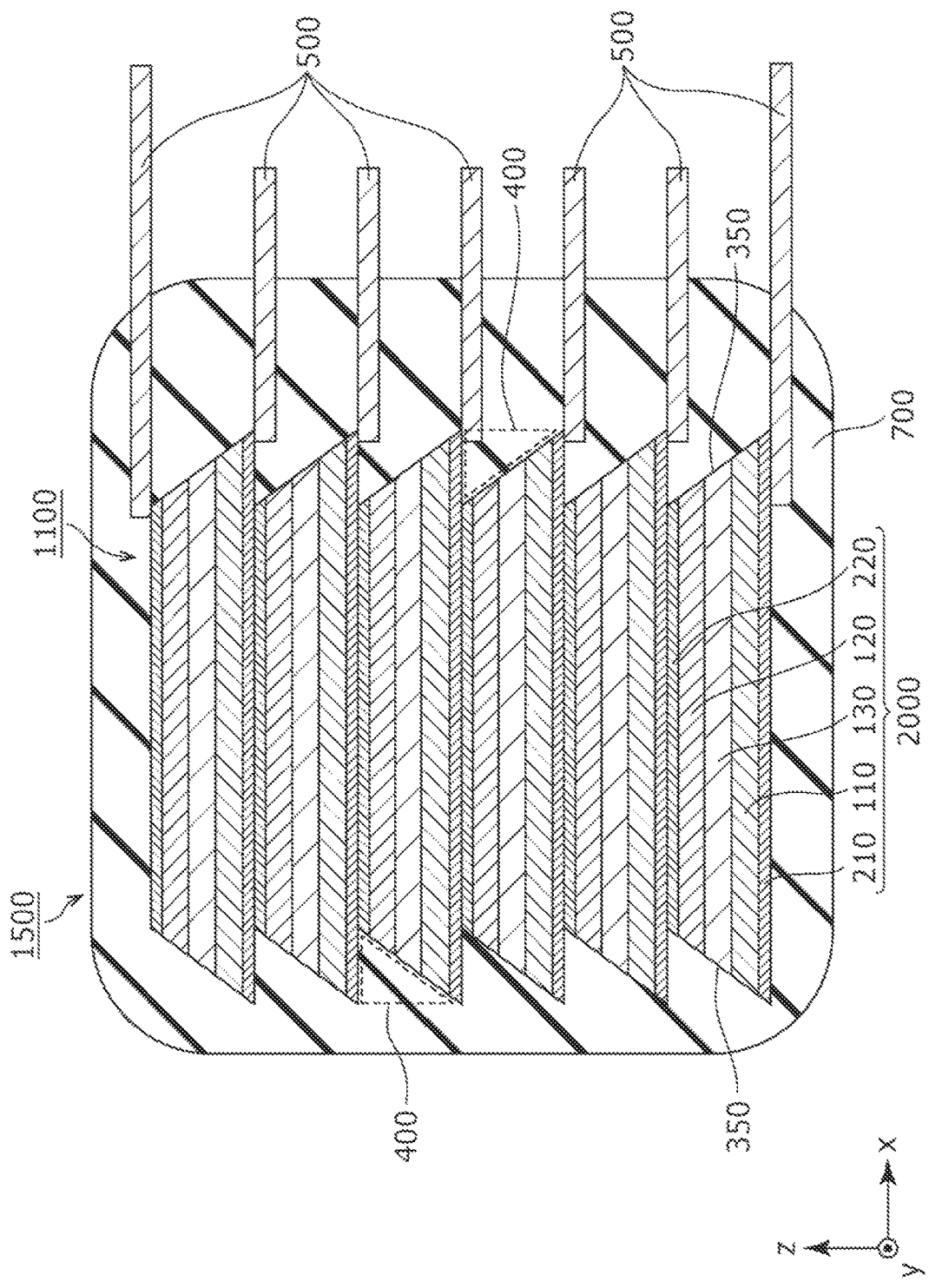
FIG. 6 is a cross-sectional view showing another example of the schematic structure of the laminated battery in embodiment 2.
Figure 7:
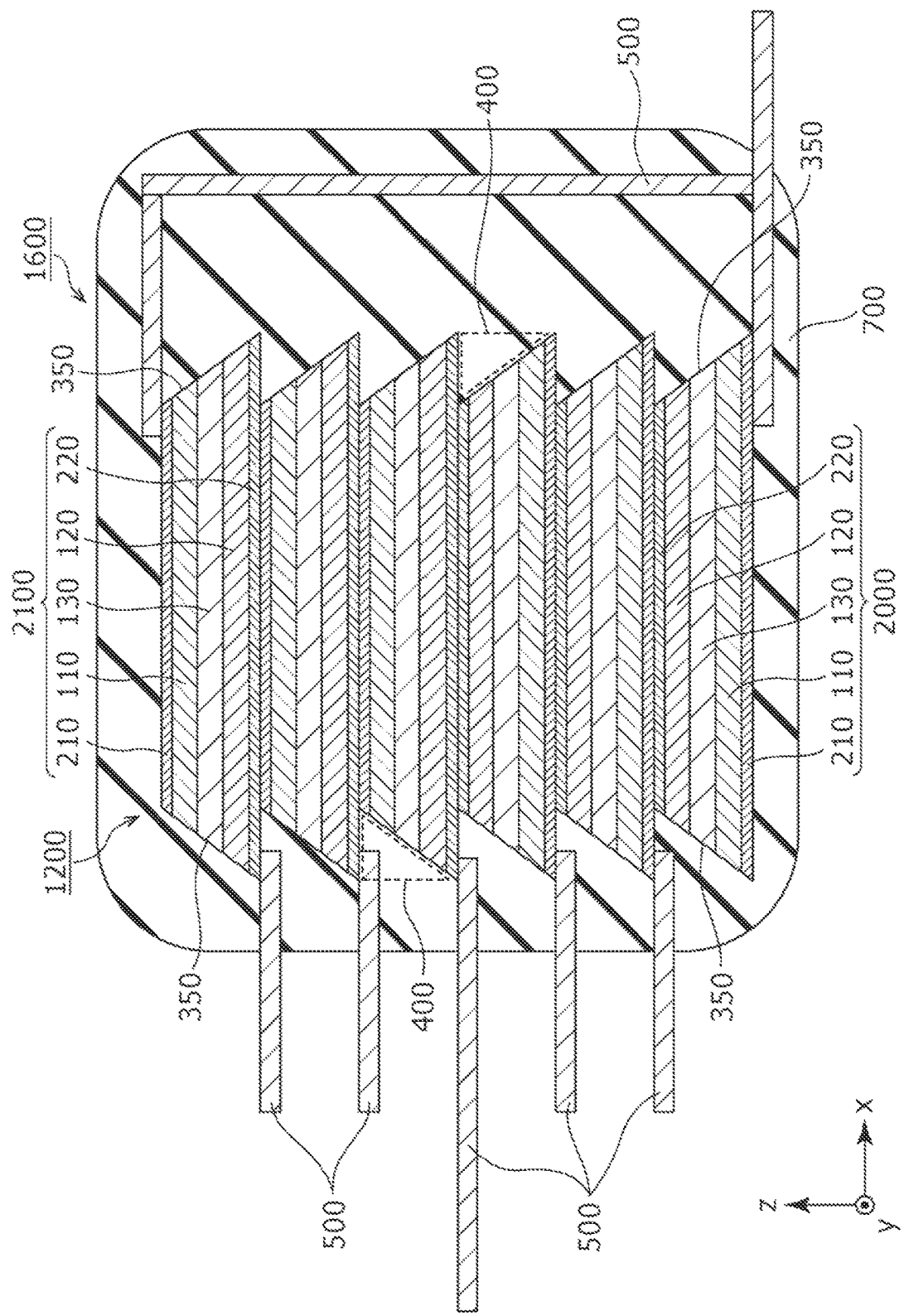
FIG. 7 is a cross-sectional view showing another example of the schematic structure of the laminated battery in embodiment 2.
Figure 8:
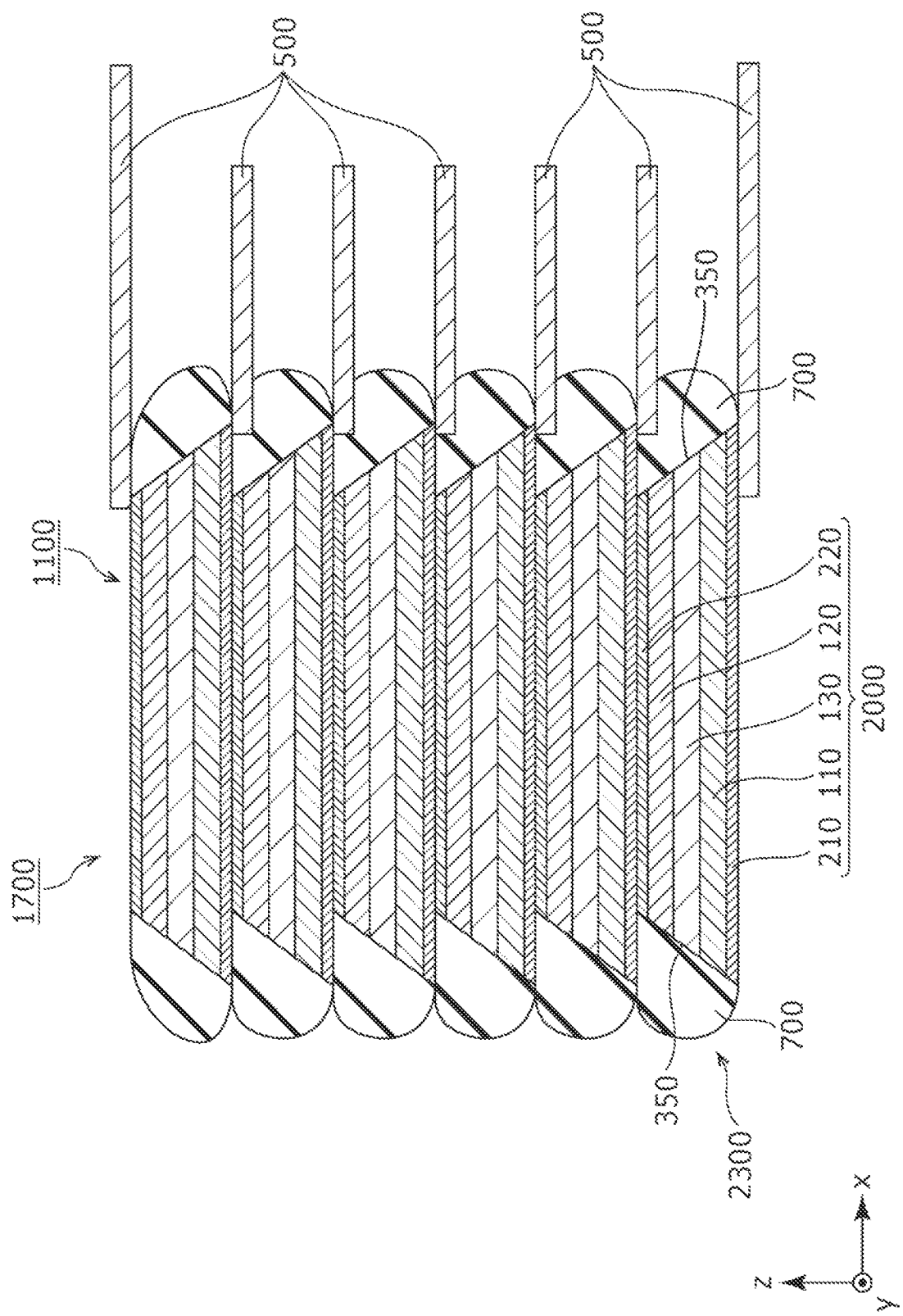
FIG. 8 is a cross-sectional view showing another example of the schematic structure of the laminated battery in embodiment 2.

Each of the laminated batteries shown in embodiment 1 and the modifications described above may further include a sealing member 700. FIGS. 5, 6, 7, and 8 show examples of the laminated battery including the sealing member 700. FIGS. 5, 6, 7, and 8 are cross-sectional views showing schematic structures of laminated batteries 1400, 1500, 1600, and 1700, respectively, in embodiment 2. Specifically, FIG. 5 shows a laminated battery 1400 including the sealing member 700 disposed around the peripheral parts of the laminated battery 1000 in embodiment 1. FIG. 6 shows the laminated battery 1500 including the sealing member 700 disposed around the peripheral parts of the laminated battery 1100 in modification 1 of embodiment 1. FIG. 7 shows the laminated battery 1600 including the sealing member 700 disposed around the peripheral parts of the laminated battery 1200 in modification 2 of embodiment 1. FIG. 8 shows the laminated battery 1700 including the sealing member 700 disposed around the peripheral parts of each of the battery cells 2000 included in the laminated battery 1100 in modification 1 of embodiment 1.

The sealing member 700 is formed using, for example, an electrically insulating material. The sealing member 700 functions also as a spacer for maintaining the laminating spaces 400.

For example, the sealing member 700 is a member containing a first material. The sealing member 700 may be, for example, a member containing the first material as a main component. The sealing member 700 may be a member formed only of the first material.

The first material used may be a well-known sealing member material for batteries such as a sealing agent. The first material used may be, for example, a resin material. The first material may be an insulating material having no ionic conductivity. The first material may be, for example, at least one of an epoxy resin, an acrylic resin, a polyimide resin, and silsesquioxane.

The sealing member 700 may contain a particulate metal oxide material. The metal oxide material used may be silicon oxide, aluminum oxide, titanium oxide, zinc oxide, cerium oxide, iron oxide, tungsten oxide, zirconium oxide, calcium oxide, zeolite, or glass. For example, the sealing member 700 may be formed using a resin material containing a plurality of metal oxide material particles dispersed therein.

It is only necessary that the particle size of the metal oxide material be equal to or lower than the gap between the negative electrode current collector 210 and the positive electrode current collector 220. The metal oxide material particles may have a perfect circular (spherical) shape, an ellipsoidal shape, or a rod-like shape.

By disposing the sealing member 700, the reliability of the laminated battery can be improved because the mechanical strength is improved, a short circuit is prevented, and moisture resistance is obtained. In this structure, the sealing member 700 is filled into the laminating spaces 400. Therefore, the sealing member 700 is less likely to peel off than when no laminating spaces 400 are provided, so that the laminated battery obtained is firmly sealed.

The laminated batteries 1400 to 1600 shown in FIGS. 5, 6, and 7 may be produced, for example, by applying the sealing member 700 to the laminated batteries 1000 to 1200. Since the battery cells 2000 and 2100 included in the laminated batteries 1000 to 1200 have the side surfaces 350 inclined with respect to the laminating direction, the sealing member 700 is unlikely to run down the side surfaces 350 during the application and is easily fixed. Therefore, the sealing member 700 can be applied from the upper or obliquely upper side of the battery cells 2000 and 2100 using a dispenser or an inkjet, so that the sealing member 700 can be easily disposed with high accuracy.

The laminated battery 1700 shown in FIG. 8 may be produced, for example, by applying the sealing member 700 to the battery cells 2000 to form battery cells 2300 coated with the sealing member 700 and then laminating the battery cells 2300. Since the battery cells 2000 have the side surfaces 350 inclined with respect to the laminating direction, the sealing member 700 can be applied to each of the battery cells 2000 from the upper or obliquely upper side of the battery cells 2000 using a dispenser or an inkjet.

Embodiment 3

Embodiment 3 will next be described. In the following description, differences from embodiments 1 and 2 and the modifications will be mainly described, and the description of common features will be omitted or simplified.

FIG. 9 is a cross-sectional view showing a schematic structure of a laminated battery 1800 in embodiment 3. Specifically, FIG. 9 shows the laminated battery 1800 including joint portions 800 formed in the laminated battery having the same structure as that of the laminated battery 1000 in embodiment 1.

As show in FIG. 9, in two adjacent battery cells 2000 and 2100 including a first battery cell 2000 or 2100 and a second battery cell 2000 or 2100, an exposed surface 300 of the first battery cell 2000 or 2100 is joined to the second battery cell 2000 or 2100 through a joint portion 800 including an electrically conductive material. Specifically, in the two adjacent battery cells 2000 and 2100, the exposed surface 300 of the first battery cell 2000 or 2100 is joined to the negative electrode current collector 210 or the positive electrode current collector 220 of the second battery cell 2000 or 2100 through the joint portion 800.

It is only necessary that, in the joint portions 800, the exposed surfaces 300 be joined to the respective current collectors using the electrically conductive material. No particular limitation is imposed on the electrically conductive material forming the joint portions 800, so long as it is a material having high electric conductivity. The electrically conductive material used may be a metal such as silver, nickel, stainless steel, aluminum, or copper. The electrically conductive material used may be an electrically conductive adhesive. The joint portions 800 may be formed, for example, by welding the exposed surfaces 300 to the current collectors to be joined thereto through the electrically conductive material or may be formed by partially fusing the exposed surfaces 300 and the current collectors to be joined thereto.

Since the joint portions 800 are formed in the laminated battery 1800, the mechanical bonding and electrical bonding between the battery cells 2000 and 2100 are further improved, and the connection impedance between the battery cells 2000 and 2100 is reduced. Therefore, advantageous effects such as a reduction in heat generation and an improvement in large-current characteristics can be obtained.

Other Embodiments

The laminated battery according to the present disclosure has been described based on the embodiments, but the present disclosure is not limited to these embodiments. Various modifications of the embodiments that are conceivable by those skilled in the art as well as other embodiments obtained by combining some of the components in the embodiments are included in the scope of the present disclosure so long as they do not depart from the scope of the present disclosure.

Various modifications, replacements, additions, omissions, etc. may be made to the above embodiments within the scope of the claims or equivalents thereof.

For example, in the above embodiments, the plurality of battery cells are laminated such that their peripheral parts are aligned with each other when viewed from the laminating direction, but this is not a limitation. To adjust the positions and shapes of the exposed surfaces, the plurality of battery cells may be laminated so as to be displaced from each other in a direction perpendicular to the laminating direction.

In the above embodiments, the side surfaces of all the plurality of battery cells are inclined with respect to the laminating direction, and all the battery cells have their exposed surfaces, but this is not a limitation. To provide the intended connection positions for the current collecting leads, a battery cell having no inclined side surfaces may be laminated, or a battery cell having no exposed surfaces may be laminated.

In the above embodiments, the shape of the battery cells in top view is rectangular, but this is not a limitation. The shape of the battery cells in top view may be circular, elliptic, or polygonal.

In the above embodiments, the side surfaces of the battery cells are inclined linearly, but this is not a limitation. The inclined side surfaces of the battery cells may be curved surfaces, and the inclination angles of the side surfaces may be partially changed. The side surfaces of each battery cell may have such a shape that only part of the side surfaces are inclined, so long as the side surfaces include side surfaces of the positive electrode current collector or the negative electrode current collector.

In the above embodiments, all the battery cells have the structure in which the positive electrode current collector, the positive electrode active material layer, the solid electrolyte layer, the negative electrode active material layer, and the negative electrode current collector are laminated together, but this is not a limitation. Two adjacent battery cells may form a structure in which layers included in these battery cells are laminated on both sides of one current collector, and the same current collector may be used for these battery cells. When one current collector is used for two adjacent battery cells, the current collector of the battery cell that has a larger area than the other on the surface on which the two adjacent battery cells face each other is used as the one current collector.

In the above embodiments, the thickness of the current collecting leads is constant, but this is not a limitation. The current collecting leads may have different thicknesses in different portions. For example, portions of the current collecting leads other than their portions having the exposed surfaces may have an increased thickness suitable for the intended purpose.

In the above embodiments, the current collecting leads are connected to the exposed surfaces of the battery cells forming the laminated battery, but this is not a limitation. The laminated battery may include a battery cell in which no current collecting lead is connected to its exposed surface. The exposed surface to which no current collecting lead is connected may be used, for example, as a surface with which a terminal, for example, is to be brought into contact from the outside or a surface on which a mark for identification, for example, is displayed.

INDUSTRIAL APPLICABILITY

The laminated battery according to the present disclosure can be used as a battery for electronic devices, electric appliances, electric vehicles, etc.

What is claimed is:

1. A laminated battery comprising:
a plurality of battery cells which are laminated; and
a current collecting lead,
wherein each of the plurality of battery cells has a structure in which a positive electrode current collector, a positive electrode active material layer, a solid electrolyte layer, a negative electrode active material layer, and a negative electrode current collector are laminated in this order,
wherein the plurality of battery cells include a first battery cell and a second battery cell that are adjacent to each other,
at least the second battery cell among the plurality of battery cells has a side surface inclined with respect to a laminating direction of the plurality of battery cells,
the first battery cell has a surface facing the second battery cell,
the surface facing the second battery cell includes an exposed surface that is not in contact with the second battery cell,
at least part of the exposed surface overlaps at least part of the side surface of the second battery cell when viewed from the laminating direction, and
the current collecting lead is connected to the exposed surface.

2. The laminated battery according to claim 1, wherein the sum of a thickness of the current collecting lead in the laminating direction and a thickness of the first battery cell in the laminating direction at a position at which the exposed surface and the side surface overlap each other when viewed from the laminating direction is smaller than the thickness of the first battery cell in the laminating direction at a position at which the exposed surface and the side surface do not overlap each other when viewed from the laminating direction.

3. The laminated battery according to claim 1, wherein a thickness of the current collecting lead in the laminating direction at a position at which the current collecting lead overlaps the exposed surface when viewed from the laminating direction is larger than a thickness of the positive electrode current collector included in the second battery cell in the laminating direction or a thickness of the negative electrode current collector included in the second battery cell in the laminating direction.

4. The laminated battery according to claim 1, wherein the plurality of battery cells are electrically connected in parallel or series.

5. The laminated battery according to claim 1, wherein the plurality of battery cells are laminated such that peripheral parts of the plurality of battery cells are aligned with each other when viewed from the laminating direction.

6. The laminated battery according to claim 1, wherein side surfaces of the plurality of battery cells are inclined in the same direction with respect to the laminating direction.

7. The laminated battery according to claim 1, wherein the plurality of battery cells have the same shape.

8. The laminated battery according to claim 1, wherein the exposed surface of the first battery cell and the second battery cell are joined together through a joint portion including an electrically conductive material.

9. The laminated battery according to claim 1, wherein the exposed surface is a surface of the positive electrode current collector included in the first battery cell or a surface of the negative electrode current collector included in the first battery cell.

* * * * *